(12) United States Patent
Gibel et al.

(10) Patent No.: US 12,241,584 B2
(45) Date of Patent: Mar. 4, 2025

(54) SELF-SUSPENDING LOCK WITH WINGS AND SYSTEM

(71) Applicant: Terra Three Industries, LLC, Pittsburgh, PA (US)

(72) Inventors: David Hubert Gibel, Pittsburgh, PA (US); Richard Karlin, Columbus, NE (US)

(73) Assignee: TERRA THREE INDUSTRIES, LLC, Pittsburgh, PA (US)

( * ) Notice: Subject to any disclaimer, the term of this patent is extended or adjusted under 35 U.S.C. 154(b) by 321 days.

(21) Appl. No.: 17/725,402

(22) Filed: Apr. 20, 2022

(65) Prior Publication Data
US 2022/0403974 A1 Dec. 22, 2022

Related U.S. Application Data

(60) Provisional application No. 63/259,037, filed on Jun. 17, 2021.

(51) Int. Cl.
*F16B 37/04* (2006.01)
*F16M 13/02* (2006.01)

(52) U.S. Cl.
CPC ........... *F16M 13/02* (2013.01); *F16B 37/045* (2013.01)

(58) Field of Classification Search
CPC .............. F16B 37/045; F16B 2200/406; E04F 2015/02077
See application file for complete search history.

(56) References Cited

U.S. PATENT DOCUMENTS

| | | | | |
|---|---|---|---|---|
| 2,217,223 A | * | 10/1940 | Hurlin | A63B 9/00 5/99.1 |
| 3,494,646 A | * | 2/1970 | Cumber | F16B 5/06 403/252 |
| 4,840,525 A | * | 6/1989 | Rebentisch | F16B 37/045 403/348 |
| 5,054,978 A | * | 10/1991 | Kowalski | F16B 37/046 411/432 |
| 5,195,854 A | * | 3/1993 | Nagayama | F16B 37/045 411/176 |
| 5,624,217 A | * | 4/1997 | Hungerford, Jr. | F16L 3/243 411/84 |
| 6,226,952 B1 | * | 5/2001 | Romeu Guardia | E03F 5/06 411/85 |
| 6,290,426 B1 | * | 9/2001 | van Gijsel | F16B 7/044 403/247 |
| 6,413,005 B1 | * | 7/2002 | Massie | F16B 5/0216 403/334 |

(Continued)

*Primary Examiner* — Bradley Duckworth
(74) *Attorney, Agent, or Firm* — The Watson IP Group, PLC; Jovan N. Jovanovic

(57) ABSTRACT

An apparatus is comprised of a securement base member and a self-suspending system. The securement base member includes a top end, a bottom end on an opposite side of the securement base member from the top end, a first side, a second side on an opposite side of the securement base member from the first side, a third side, a fourth side on an opposite side of the securement base member from the third side, and an opening disposed within the top end, the opening to accept a fastener. The self-suspending system is coupled to the top end of the securement base member, the self-suspending system suspending the securement base member below two portions of a surface having a slot therebetween.

20 Claims, 7 Drawing Sheets

(56) References Cited

U.S. PATENT DOCUMENTS

| | | | | |
|---|---|---|---|---|
| 6,588,711 B2* | 7/2003 | Onishi | ............... | F16B 37/045 |
| | | | | 248/221.11 |
| 7,241,094 B1* | 7/2007 | Potts | ............... | F16B 33/002 |
| | | | | 411/87 |
| 7,621,487 B2* | 11/2009 | Brown | ............... | F16B 7/0473 |
| | | | | 248/65 |
| 9,825,581 B2* | 11/2017 | Wildes | ............... | F24S 25/61 |
| 11,525,474 B1* | 12/2022 | Schick | ............... | F16B 39/282 |
| 2005/0117993 A1* | 6/2005 | Vassiliou | ............... | F16B 37/02 |
| | | | | 411/173 |
| 2009/0103996 A1* | 4/2009 | Menon | ............... | F16B 37/045 |
| | | | | 411/111 |

* cited by examiner

SELF-SUSPENDING LOCK WITH WINGS AND SYSTEM

CROSS-REFERENCE TO RELATED APPLICATION

This application claims priority from U.S. Provisional Patent Application Ser. No. 63/259,037 filed on Jun. 17, 2021, entitled "Self-Suspending Lock with Angled Wings", the entire disclosure of which is hereby incorporated by reference in its entirety.

BACKGROUND OF THE DISCLOSURE

1. Field of the Disclosure

The disclosure relates in general to a self-suspending lock, and more particularly, to a self-suspending lock with wings.

Slotted flooring typically includes a plurality of long slots and can be cast in-place or precast. Precast slotted flooring includes portable panels that are transported to a desired location. The portable panels are typically disposed against each other to cover a large area, forming a large planar surface.

Such slotted flooring can be used for a variety of use cases, with an exemplary use case including forming a fenced area. Such fenced area can be used to confine people, such as in an entertainment venue, livestock on farms, and any other confinement use case. Fencing panels can be coupled to the slotted flooring via brackets and fasteners that are coupled to the slots.

Of course, it will be understood that the self-suspending lock with wings is not limited to use in association with slotted flooring, or flooring in general, and can be used in other applications.

SUMMARY OF THE DISCLOSURE

The disclosure is directed to an apparatus comprised of a securement base member and a self-suspending system. The securement base member includes a top end, a bottom end on an opposite side of the securement base member from the top end, a first side, a second side on an opposite side of the securement base member from the first side, a third side, a fourth side on an opposite side of the securement base member from the third side, and an opening disposed within the top end, the opening to accept a fastener. The self-suspending system is coupled to the top end of the securement base member, the self-suspending system suspending the securement base member below two portions of a surface having a slot therebetween.

In at least one configuration of the apparatus, the self-suspending system includes first and second wings coupled to the top end of the securement base member. The first wing is disposed proximate to the first side of the securement base member and the second wing is disposed proximate to the second side of the securement base member. Each of the first and second wings comprises a suspension arm and a cross member. The suspension arm includes a first end and a second end, the first end of the suspension arm being coupled to the top end of the securement base member. The cross member is coupled to the second end of the suspension arm, the cross member lying atop the two portions of the surface having a slot therebetween. In some configurations, this may be atop two slats of a slotted wall.

In at least one configuration of the apparatus, the suspension arm includes a first arm portion and a second arm portion. The first arm portion is coupled to the top end of the securement base member at an acute angle facing away from the securement base member, and the second arm portion is coupled to the first arm portion at an obtuse angle facing away from the securement base member.

In at least one configuration of the apparatus, the top end includes angled surfaces on either side of a central portion of the top end.

In at least one configuration of the apparatus, the opening extends through the securement base member from the top end to the bottom end.

In at least one configuration of the apparatus, the opening is circular.

In at least one configuration of the apparatus, both the top and bottom ends are planar, with the top end being parallel with the bottom end.

In at least one configuration of the apparatus, the securement base member includes a first width that is smaller than a second width between two portions of the surface such that planes of the first and second sides of the securement base member remain substantially parallel to planes of neighboring surfaces, respectively, during installation of the apparatus onto the surface.

In at least one configuration of the apparatus, the apparatus further comprises a nut disposed proximate to the bottom end of the securement base member, the nut being accessible via the opening.

In at least one configuration of the apparatus, a system comprises the apparatus, with the system further comprising a bracket coupled to the apparatus via a fastener.

In at least one configuration of the apparatus, the bracket is a tie down bracket.

In at least one configuration of the apparatus, the bracket is a fence bracket, the system further comprising a fence panel coupled to the fence bracket.

The disclosure is also directed to a system comprising an apparatus and a bracket. The apparatus is comprised of a securement base member and a self-suspending system. The securement base member includes a top end, a bottom end on an opposite side of the securement base member from the top end, a first side, a second side on an opposite side of the securement base member from the first side, a third side, a fourth side on an opposite side of the securement base member from the third side, and an opening disposed within the top end, the opening to accept a fastener. The self-suspending system is coupled to the top end of the securement base member, the self-suspending system suspending the securement base member below two portions of a surface having a slot therebetween. The bracket coupled to the apparatus via a fastener.

In at least one configuration of the system, the bracket is a tie down bracket.

In at least one configuration of the system, the bracket is a fence bracket, the system further comprising a fence panel coupled to the fence bracket.

In at least one configuration of the system, the self-suspending system includes first and second wings coupled to the top end of the securement base member, the first wing being disposed proximate to the first side of the securement base member and the second wing being disposed proximate to the second side of the securement base member. Each of the first and second wings comprises a suspension arm and a cross member. The suspension arm includes a first end and a second end, the first end of the suspension arm being coupled to the top end of the securement base member. The cross member is coupled to the second end of the suspension arm, the cross member lying atop the two portions of the surface having a slot therebetween.

In at least one configuration of the system, the suspension arm includes a first arm portion and a second arm portion. The first arm portion is coupled to the top end of the securement base member at an acute angle facing away from the securement base member, and the second arm portion is coupled to the first arm portion at an obtuse angle facing away from the securement base member.

In at least one configuration of the system, the top end includes angled surfaces on either side of a central portion of the top end.

In at least one configuration of the system, the opening extends through the securement base member from the top end to the bottom end.

In at least one configuration of the system, the securement base member includes a first width that is smaller than a second width two portions of the surface such that planes of the third and fourth sides of the securement base member remain parallel to vertical walls of neighboring surface, respectively, during installation of the apparatus onto the surface.

BRIEF DESCRIPTION OF THE DRAWINGS

The disclosure will now be described with reference to the drawings wherein.

DETAILED DESCRIPTION OF THE DISCLOSURE

Figure 1:
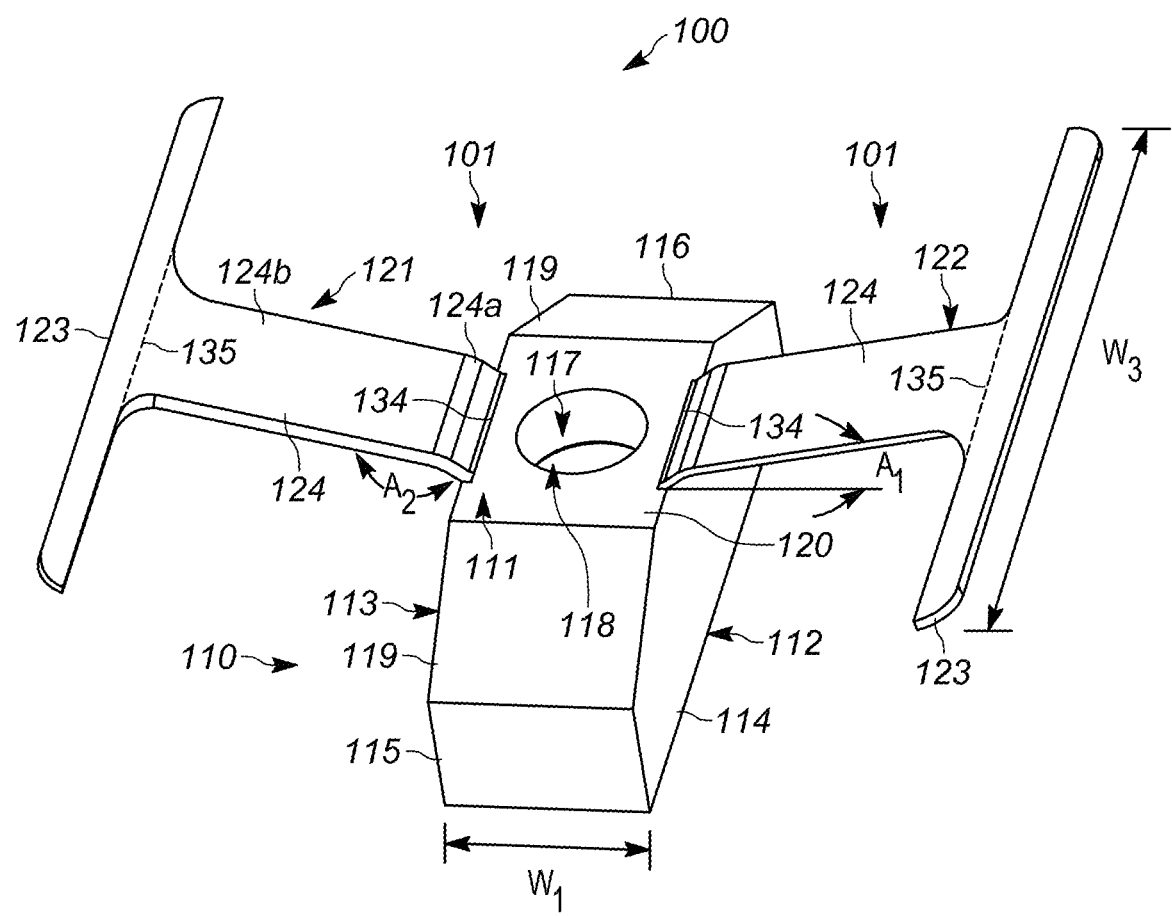
FIG. 1 illustrates an isometric view of an exemplary self-suspending lock with wings, in accordance with at least one configuration disclosed herein.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
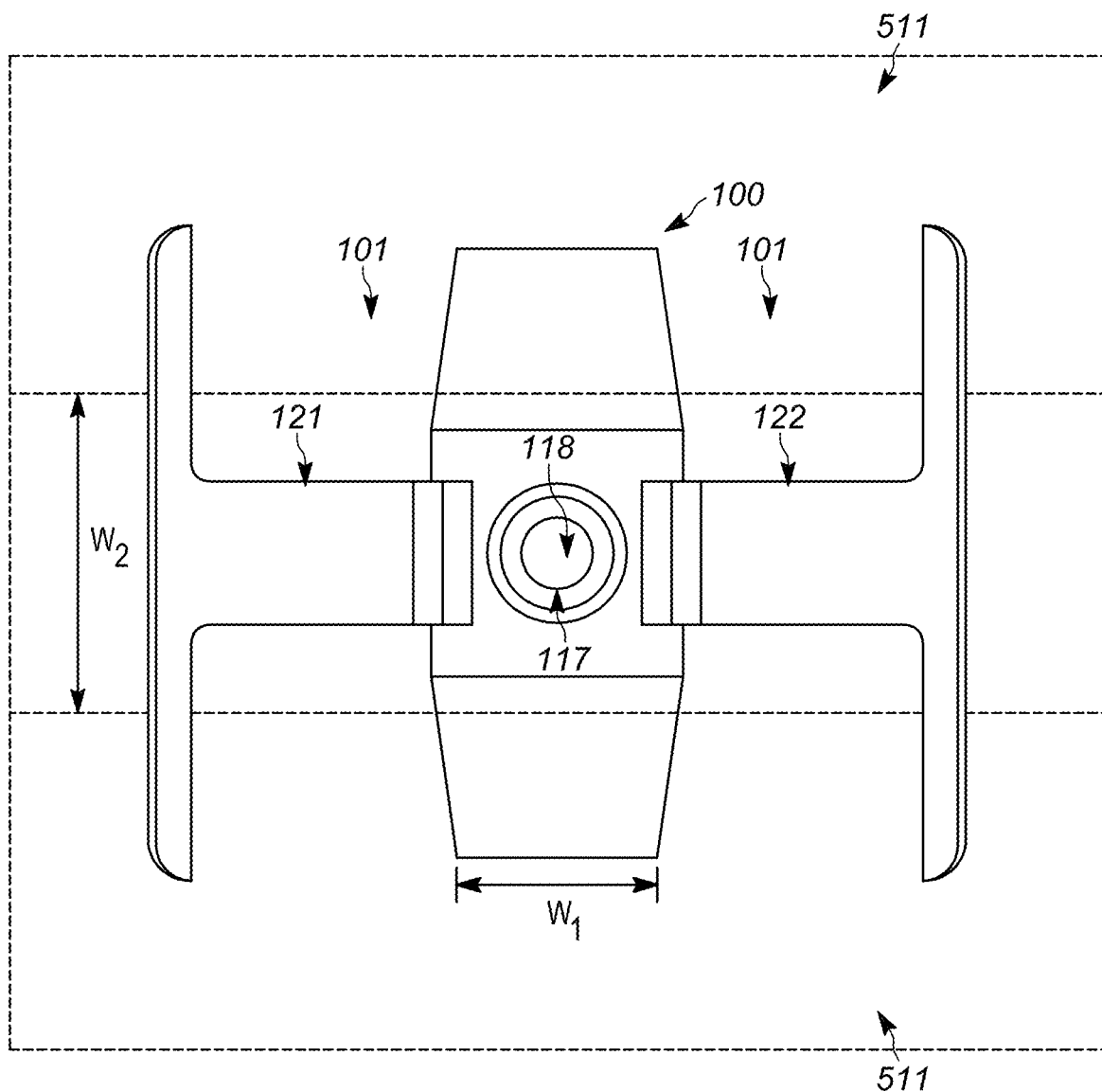
FIG. 2 illustrates a top view of the self-suspending lock shown in FIG. 1, in accordance with at least one configuration disclosed herein.
Figure 3:
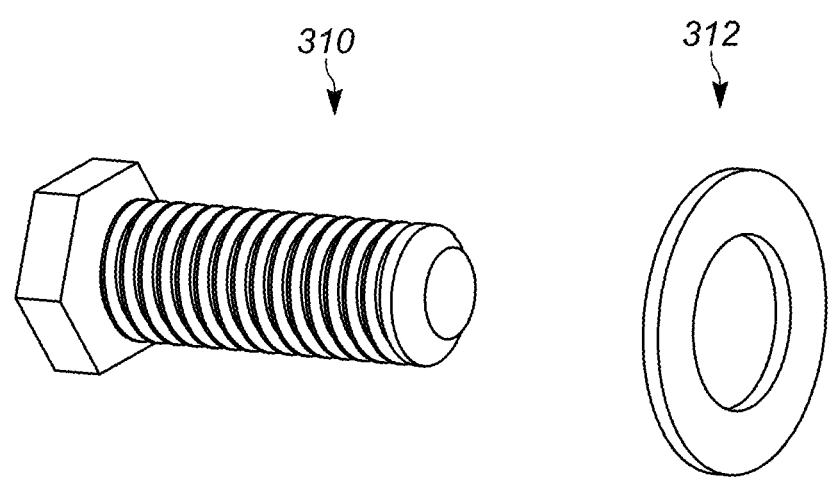
FIG. 3 illustrates an isometric view of an exemplary fastener that can be used with the self-suspending lock shown in FIG. 1, in accordance with at least one configuration disclosed herein.
Figure 4:
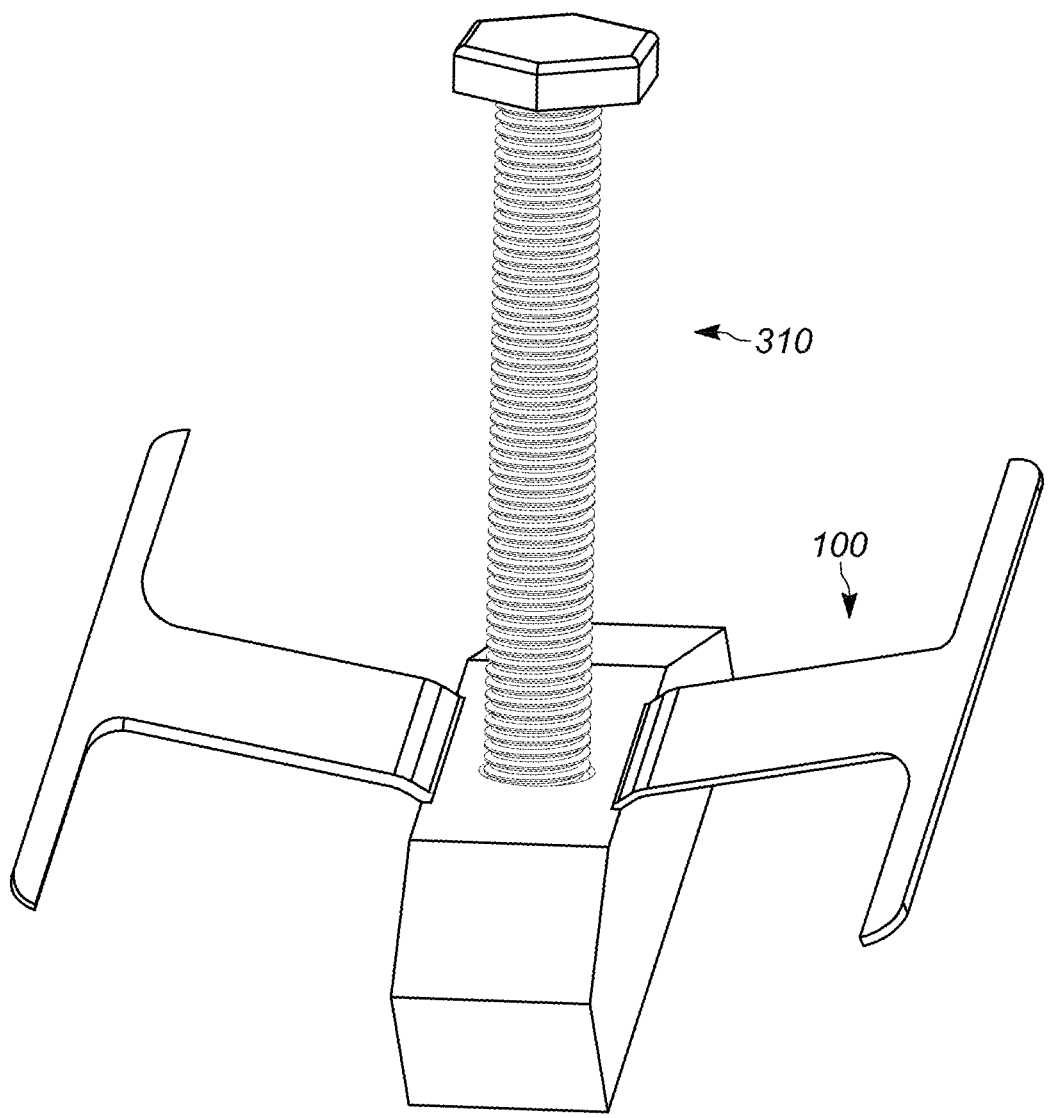
FIG. 4 illustrates an isometric view of the self-suspending lock shown in FIG. 1 with the fastener shown in FIG. 3 installed therein, in accordance with at least one configuration disclosed herein.
Figure 5:
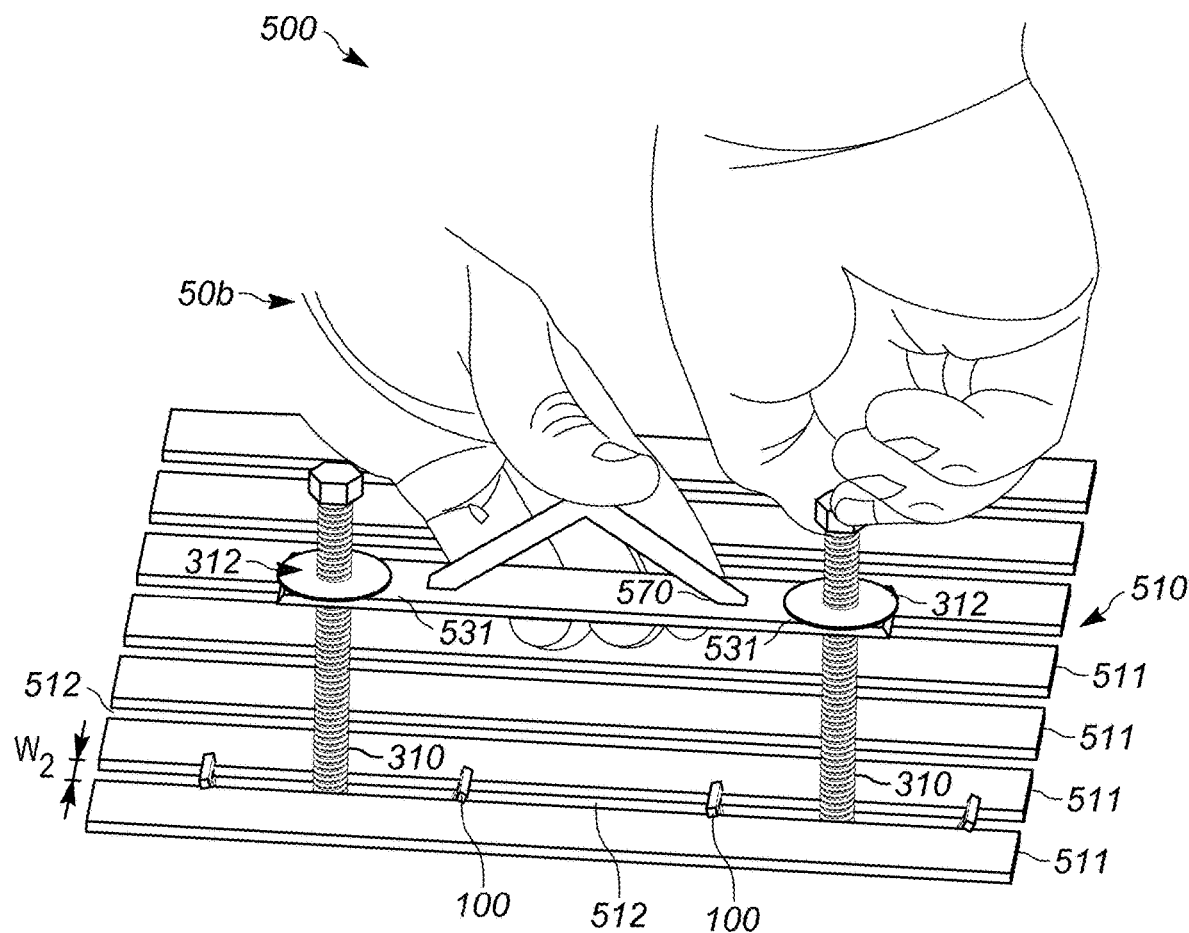
FIG. 5 illustrates a technician installing the self-suspending lock shown in FIG. 1 onto slotted flooring, in accordance with at least one configuration disclosed herein.

Referring now to the drawings and in particular to FIG. 1, an apparatus is disclosed, such as a self-suspending lock 100. The self-suspending lock 100 can be used to secure fixtures, such as brackets that support livestock fencing and gates, to a slotted floor or "slat" without having to manually suspend the self-suspending lock 100 during installation, as discussed in more detail below (of course, while not being limited thereto, wherein the apparatus can be used to secure fixtures to a surface by being directed through a slot between two spaced apart portions of the surface, with the understanding that the two portions may comprise a unitary structure with a slot defined therein, thereby forming spaced apart portions on either side of the slot). The self-suspending lock 100 includes a securement base member 110 and a self-suspending system 101 to self-suspend the securement base member 110 during installation, as discussed below. The securement base member 110 includes a top end 111 and a bottom end 112 on an opposite side of the securement base member 110 from the top end 111. The securement base member 110 also includes a first side 113 and a second side 114 on an opposite side of the securement base member 110 from the first side 113. The securement base member 110 yet further includes a third side 115 and a fourth side 116 on an opposite side of the securement base member 110 from the third side 115. To allow the securement base member 110 to accept a fastener, such as bolt 310 (e.g., metal or durable plastic, such as nylon) shown in FIG. 3, the securement base member 110 even further includes an opening 117 disposed within the top end 111. In at least one configuration, the securement base member 110 includes a width W1 that is smaller than a width W2 between slats 511 (FIG. 2) of a slotted floor 510 (FIG. 5). It is contemplated that the securement base member may be hollowed so as to save weight and/or for purposes of molding. In other configurations, the securement base member may be solid (other than the opening).

Planes of the first and second sides 113, 114 of the securement base member 110 remain parallel to vertical walls 512 of neighboring slats 511, respectively, during installation of the self-suspending lock 100 between the slats 511 of the slotted floor 510. Thus, the self-suspending lock 100 can be installed between the slats 511 of the slotted floor 510 without having to tilt the self-suspending lock 100 during installation, thereby simplifying installation of the self-suspending lock 100 between the slats 511. In at least one configuration, the top end 111 includes angled surfaces 119 on either side of a central portion 120 of the top end 111, as shown, although in still at least one other configuration the top end 111 can be planar entirely across.

In other configurations, the top end 111 may comprise an outwardly convex surface that may be rounded or arcuate (i.e., much like a half moon shape). Additionally, other shapes that may engage different types of structures (flooring components, among other non-flooring components) are likewise contemplated for use. Such shapes may include serrations, convex or concave configurations, or the like on the top end. Such configurations may be symmetrical about the opening, or may be non-symmetrical.

In at least one configuration, both the top and bottom ends 111, 112 of the securement base member 110 are planar, with the top end 111 of the securement base member 110 being parallel with the bottom end 112 of the securement base member 110, as shown. In other configurations, the top and bottom ends 111, 112 of the securement base member 110 can be domed, either concave or convex, without departing from the scope of this disclosure. The top and bottom ends 111, 112 can even be oppositely domed, for example the top end 111 of the securement base member 110 can be convex and the bottom end 112 of the securement base member 110 can be concave.

The opening 117 can extend through the securement base member 110 from the top end 111 to the bottom end 112. In at least one other configurations, the opening 117 can extend through the top end 111 of the securement base member 110, but end before reaching the bottom end 112 of the securement base member 110. In at least one configuration, the opening 117 is circular to match a shape of a fastener, such as the bolt 310. In other configurations, the opening 117 can be other shapes, such as square, oval, triangular, rectangular, pentagonal, hexagonal, or any other shapes that allow the fastener to be disposed within the opening 117.

The self-suspending system 101 is shown as being coupled to the top end 111 of the securement base member 110. Such coupling of the self-suspending system 101 to the top end 111 of the securement base member 110 stabilizes the self-suspending lock 100 during installation, mitigating stabilization problems associated with a typical lock. The self-suspending system 101 suspends the securement base member 110 below the slats 511 of the slotted floor 510. Although the self-suspending system 101 can take on various configurations, in at least one configuration the self-suspending system 101 includes first and second wings 121, 122 coupled to the top end 111 of the securement base member 110. The first wing 121 is disposed proximate to the first side 113 of the securement base member 110 and the second wing 122 being disposed proximate to the second side 114 of the securement base member 110. As the first and second wings 121, 122 are substantially identically configured, each of the first and second wings 121, 122 include a suspension arm 124 and a cross member 123. The suspension arm 124 includes a first end 134 and a second end 135. The first end 134 of the suspension arm 124 is coupled to the top end 111 of the securement base member 110, as shown. The cross member 123 is coupled to the second end 135 of the suspension arm 124, the cross member 123 having a width W3 that allows the cross member 123 to lie atop the slats 511 of the slotted floor 510. The securement base member 110 and the suspension system 101 can be made of a durable plastic, such as nylon.

In at least one configuration, the suspension arm 124 can be entirely straight, but in at least one other configuration the suspension arm 124 includes a first arm portion 124a and a second arm portion 124b. The first arm portion 124a is coupled to the top end 111 of the securement base member 110 at an acute angle A1 that faces away from the securement base member 110. The second arm portion 124b is coupled to the first arm portion 124a at an obtuse angle A2 that faces away from the securement base member 110. In at least one configuration, although the shown angle A2 is larger than the angle A1, in other configurations the angle A2 can be smaller than the angle A1.

To secure the self-suspending lock 100 to a bracket, examples of which are discussed below, via the bolt 310, a nut 118 can be disposed proximate to the bottom end 112 of the securement base member 110. In at least one configuration, the bolt 310 can be used in combination with a washer 312 (FIG. 3), that can be made of either a metal or a durable plastic, such as nylon. This nut 118 is accessible via the opening 117, such that the bolt 310 is disposed into the opening 117 and secured to the nut 118. Rotating the bolt 310 draws the nut 118, and likewise the securement base member 110, toward the slats 511 until the top end 111 of the securement base member 110 is secured against a bottom of the slats 511. The nut 118 can be integrated with the securement base member 110 during manufacture of the self-suspending lock 100, either of a same material as the securement base member 110 or a different material as the securement base member 110, or added to the securement base member 110 post manufacturer, such as when a technician is preparing to install the self-suspending lock 100. In some configurations, the nut 118 may be molded into the securement base member 110. As with the bolt, the nut 118 may comprise any number of different materials, such as metal or a durable plastic, such as nylon or the like. Although a bolt 310 and a nut 118 are disclosed herein to fasten the self-suspending lock 100 to a bracket and the slotted floor 510, other types of fasteners can be used, including non-threaded fasteners.

In some configurations, a piece of material may extend into the path of the fastener, such as a piece of plastic (i.e., from which the securement base member is made). Such a piece of material performs can apply a radial compressive force onto the fastener against the threads to prevent relative movement between the body and the fastener, to, in turn, aid grasping and retention.

At least one self-suspending lock 100 can be used within a system, such as system 500 shown in FIG. 5. The system 500 further includes a bracket that is coupled to the self-suspending lock 100, such as tie down bracket 530. In this example, the tie down bracket 530 includes two (2) openings 531 that are disposed proximate to either ends thereof. During installation of the system 500, the technician first grasps the first and second wings 121, 122 of the two (2) self-suspending locks 100 and bends (i.e., squeezes) them to be vertical. The two (2) self-suspending locks 100 are then dropped between two (2) neighboring slats 511 and rotated ninety (90) degrees to prevent the securement base member 110 from moving vertically to be removed from between the two neighboring slats 511. The self-suspending locks 100 self-suspending to prevent the self-suspending locks 100 from falling under the slotted floor 510 during installation. The two self-suspending locks 100 are spaced approximately a same distance apart as the openings 531 within the tie down bracket 530. Then, two bolts 310, with washers 312 installed onto the bolts 310, are disposed through these openings 531. The two bolts 310 are aligned with the two self-suspending locks 100 such that the bolts 310 can enter the openings 117 on the securement base members 110, respectively.

As shown, the bolts 310 can be tightened with one hand 505 of a technician while the other hand 506 of the technician holds the tie down bracket 530. The technician does not need to manually hold the two self-suspending locks 100 during such installation of the bolts 310. As the technician continues to tighten the bolts 310, the self-suspending locks 100 are drawn upward as the tie down bracket 530 is drawn downward, both toward the slates 511. Once both the self-suspending locks 100 and the tie down bracket 530 are drawn against the slats 511, a ratchet and socket (not shown), or similar tool, can be used to secure the tie down bracket 530 against the slats 511 so as to not be easily removed without use of the ratchet and socket.

Figure 6:
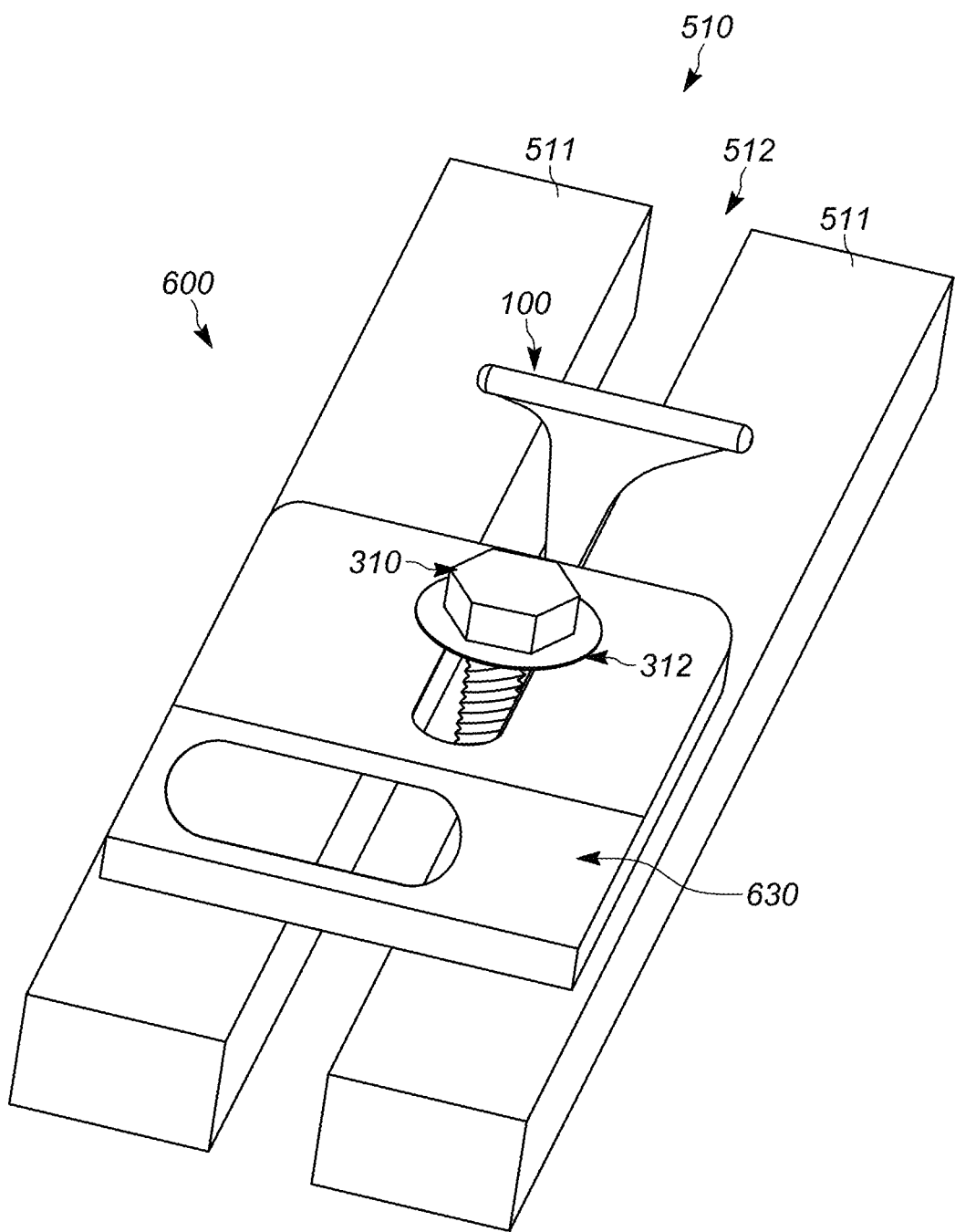
FIG. 6 illustrates the self-suspending lock shown in FIG. 5 after the technician has completed installation thereof, in accordance with at least one configuration disclosed herein.
Figure 7:
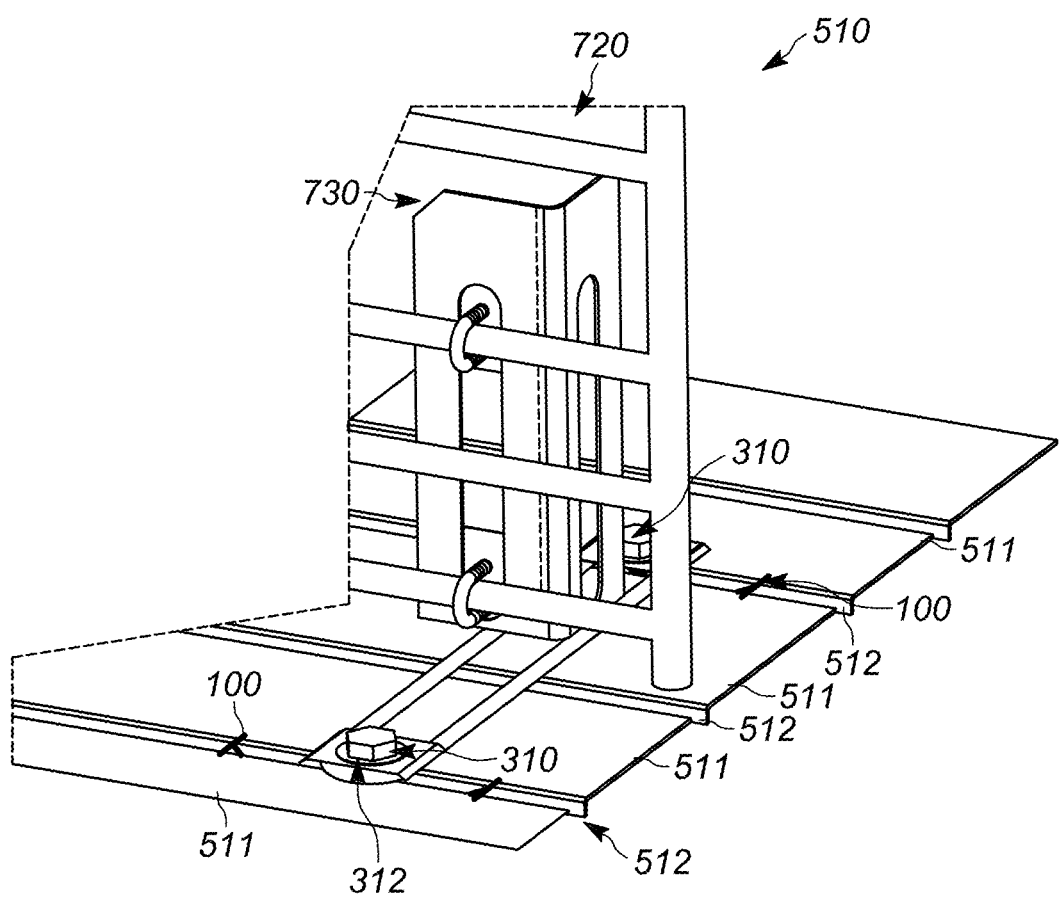
FIG. 7 illustrates the self-suspending lock shown in FIG. 1 used to secure a fence panel onto slotted flooring, in accordance with at least one configuration disclosed herein.

FIG. 6 shows another system 600 in which only one (1) of two (2) self-suspending locks 100 is shown as coupling another type of bracket 630 to two (2) neighboring slats 511 of the slotted floor 510. FIG. 7 shows yet another system 700 in which two (2) of the self-suspending locks 100 are shown as coupling yet another type of bracket, a fence bracket 730 to the slotted floor 510. As shown, the system 500 further includes a fence panel 720 coupled to the fence bracket 730. The brackets 630, 730 are coupled to the self-suspending locks 100 and the slotted floor 510 in a similar manner as described above for the tie down bracket 530. Thus, the self-suspending locks 100 can be constructed to have strength needed to support the fence panel 720 or any other fixture that requires such strength.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. An apparatus comprising:
    a securement base member including a top end, a bottom end on an opposite side of the securement base member from the top end, a first side, a second side on an opposite side of the securement base member from the first side, a third side, a fourth side on an opposite side of the securement base member from the third side, and an opening disposed within the top end, the opening to accept a fastener; and
    a self-suspending system coupled to the top end of the securement base member, the self-suspending system to suspend the securement base member below two portions of a surface having a slot therebetween, wherein the self-suspending system includes first and second wings coupled to the top end of the securement base member, the first wing being disposed proximate to the first side of the securement base member and the second wing being disposed proximate to the second side of the securement base member, each of the first and second wings being comprising:
        a suspension arm including a first end and a second end, the first end of the suspension arm being coupled to the top end of the securement base member; and
        a cross member coupled to the second end of the suspension arm, each cross member extending beyond the suspension arm on each opposing side so as to define a generally T-shaped configuration, the cross member to lie atop the two portions of the surface having a slot therebetween.

2. The apparatus according to claim 1, wherein the top end includes angled surfaces on either side of a central portion of the top end.

3. The apparatus according to claim 1, wherein the opening extends through the securement base member from the top end to the bottom end.

4. The apparatus according to claim 1, wherein the opening is circular.

5. The apparatus according to claim 1, wherein both the top and bottom ends are planar, with the top end being parallel with the bottom end.

6. The apparatus according to claim 1, further comprising a nut disposed proximate to the bottom end of the securement base member, the nut being accessible via the opening.

7. A system comprised of the apparatus according to claim 1, the system further comprising a bracket coupled to the apparatus via the fastener, with the bracket and the securement base member being on opposite sides of the two portions and with the fastener extending through the slot.

8. The system according to claim 7, wherein the bracket is a tie down bracket.

9. The system according to claim 7, wherein the bracket is a fence bracket, the system further comprising a fence panel coupled to the fence bracket.

10. The apparatus of claim 1 wherein the first and second wings are flexible such that they can be pinched toward each other to overlie the top end of the securement base member.

11. A method of installing the apparatus of claim 1, the method comprising the steps of:
    providing the apparatus;
    squeezing the first and second wings together;
    directing the securement base member between a two portions of a surface having a slot therebetween, the two portions of the surface defining an upper surface and a lower surface opposite the upper surface such that at least a portion of the top end extends beyond the lower surface of the two portions and at least a portion of the suspension arm of each of the first and second wings extend beyond the upper surface of each of the two portions;
    rotating the apparatus so that the suspension arms of each of the first and second wings extend between the slot, on opposing sides of the securement base member so that each of the cross members of the first and second wings extend over at least a portion of at least one of the two portions; and
    engaging at least one of the cross member of the first and second wings with the upper surface of at least one of the two portions, so as to preclude passage of the cross member through the slot.

12. The method of claim 11 further comprising the step of:
    suspending the securement base member below the lower surface of the two portions through the interaction of the cross members and the portions.

13. The method of claim 11 wherein a width of the securement base member is defined by the first side and the second side and the length is defined by the third side and the fourth side, wherein the width is smaller than a width of the slot, and the length is larger than the width of the slot.

14. The method of claim 13 wherein each of the suspension arms has a width, at least a portion of the width of the suspension arm being smaller than the width of the slot.

15. The method of claim 13 wherein the cross members each define a width, the width of the cross members being larger than the width of the slot.

16. The method of claim 11 further comprising the steps of:
    providing a fastener; and
    directing the fastener through the slot and into the opening of the securement base member.

17. The method of claim 16 wherein the fastener comprises a threaded fastener, and the opening includes a threaded portion, the method further comprising the step of:
    threadedly engaging the fastener with the opening of the securement base member.

18. A system comprising:
    an apparatus comprised of a securement base member and a self-suspending system, the securement base member including a top end, a bottom end on an opposite side of the securement base member from the top end, a first side, a second side on an opposite side of the securement base member from the first side, a third side, a fourth side on an opposite side of the securement base member from the third side, and an opening disposed within the top end, the opening to accept a fastener, the self-suspending system being coupled to the top end of the securement base member, the self-suspending system to suspend the securement base member below two portions of a surface having a slot therebetween, the self-suspending system comprising a first wing extending from the top end proximate the first side, and a second wing extending from the top end proximate the second side, each of the first and second wings including a suspension arm having a first end at the securement base member and a second end spaced apart therefrom, and a cross member positioned proximate the second end, and spaced apart from the first end, the cross member extending to either side of the securement base member; and a bracket coupled to the apparatus via the fastener, with the bracket being on a side opposite the side of the securement base member and with the fastener extending through the slot.

19. The system according to claim 18, wherein the bracket is a tie down bracket.

20. The system according to claim 18, wherein the bracket is a fence bracket, the system further comprising a fence panel coupled to the fence bracket.

* * * * *